United States Patent [19]
Volz

[11] 3,891,326
[45] June 24, 1975

[54] MULTI-CHANNEL SUN PHOTOMETER

[76] Inventor: Frederic E. Volz, 24 Tyler Rd., Lexington, Mass. 02173

[22] Filed: Jan. 14, 1974

[21] Appl. No.: 433,175

[52] U.S. Cl. .................. 356/222; 356/225; 356/226
[51] Int. Cl. ............................................. G01j 1/42
[58] Field of Search ............ 356/75, 103, 201, 208, 356/216, 218, 220, 222, 225, 226, 256

[56] References Cited
UNITED STATES PATENTS
3,625,613  12/1971  Abell et al. ........................... 356/75
3,667,850  6/1972   Smith et al. ...................... 356/216 X OTHER PUBLICATIONS
Dande Kar, Applied Optics, Vol. 8, No. 12, December 1969, pages 2564 and 2565.
Herman et al., Journal of the Atmospheric Sciences, Vol. 28, No. 3, April 1971, pages 419–428.
Shaw et al., Journal of Applied Meteorology, Vol. 12, No. 2, March 1973, pages 374–380.

*Primary Examiner*—Ronald L. Wibert
*Assistant Examiner*—F. L. Evans
*Attorney, Agent, or Firm*—Jacob N. Erlich

[57] ABSTRACT

A multi-channel sun photometer having a housing which contains therein a plurality of openings and filters optically aligned with a silicon photovoltaic photocell. A microammeter is operably connected to the photocell for providing a reading of the amount of light passing through the filters. In addition to the light measurements registered an angle or optical path length measurement can be obtained on a diopter pivotably mounted on the side of the photometer housing.

9 Claims, 3 Drawing Figures

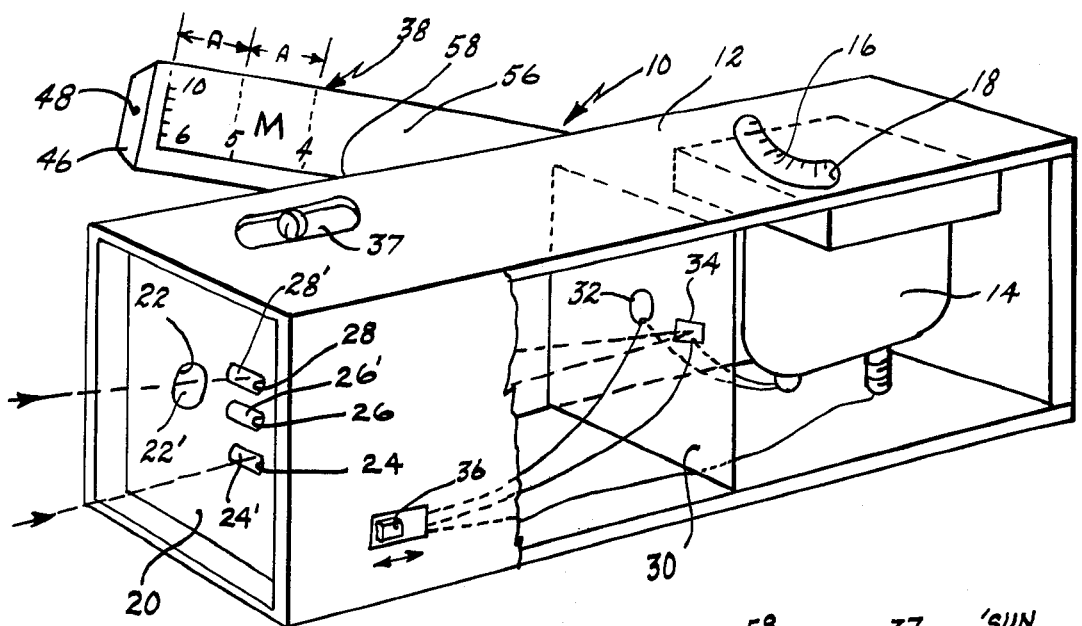
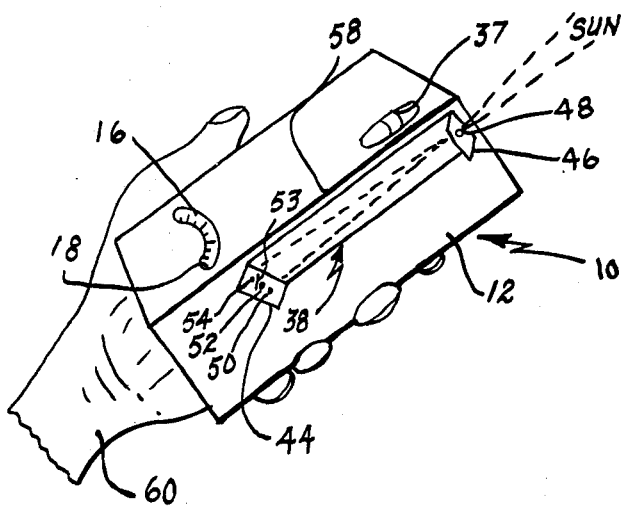
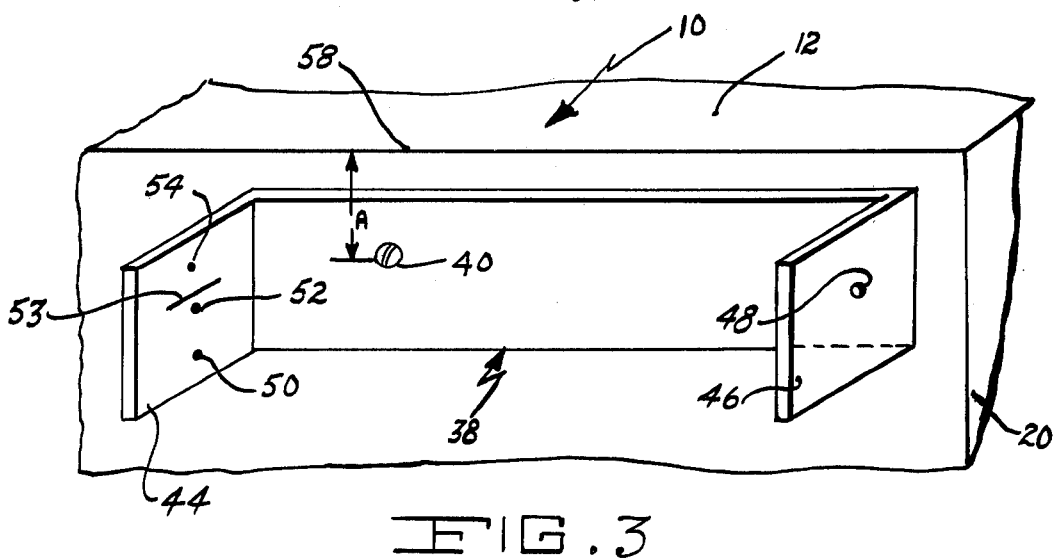

MULTI-CHANNEL SUN PHOTOMETER

BACKGROUND OF THE INVENTION

This invention relates generally to photometers, and more particularly, to a sun photometer which incorporates therein a plurality of radiation filters and is capable of measuring solar angles or atmospheric path lengths.

Photometry is that branch of science which deals with the calculation and measurement of light. In most cases photometry is usually concerned with measurements of luminous intensity, luminous flux, luminous flux density, luminance, light distribution, color, absorption factor, spectral distribution, the reflectance and transmittance of light as well as visibility measurements.

A photometer is that structure which is used for making measurements of light or electromagnetic radiation in the visisble range. In general, photometers may be divided into two classifications: laboratory photometers, which are usually fixed in position and portable photometers which are used in the field or outside the laboratory. The instant invention deals with the latter group and in particular to the photoelectric photometer.

Photometers of the past which fall into this category rely upon photocells for their operation. This type of photometer generally utilizes a barrier-layer photocell made up of an iron plate coated with a thin layer of selenium which in turn is covered with a very thin transparent film of metal such as gold or platinum. A ring of metal is sprayed around the edge of this film and when this metal ring is connected to one terminal of a sensitive microammeter or galvanometer and the other terminal is connected to the iron plate, a current flows through the structure when light penetrates the metal film to the slenium layer.

Heretofore such a self contained photometer was limited to the measurement of atmospheric transmission in selected narrow spectral ranges. In such earlier sun photometers the radiation filters had to be successively substituted by a mechanical filter changer. In addition, the utilization of the selenium photovoltaic photocell left much to be desired since the meter response was not fully linear, the instrument was dependent upon temperature and had a very limited spectral range.

SUMMARY OF THE INVENTION

The instant invention sets forth a multi-channel sun photometer which overcomes the problems set forth in detail hereinabove. It should be noted that although the primary function of this invention is as a sun photometer, the photometer set forth hereinbelow with suitable amplification is also useable in making a wide variety of other light measurements.

The photometer of this invention is made up of a box having a microammeter mounted in one end thereof which is readable through a slot in the top of the box. A first diaphragm is located at the other end of the box and a second diaphragm is located between the first diaphragm and the microammeter. A light detector in the form of a silicon photovoltaic photocell or detector is positioned within the second diaphragm and is located behind an opening in the first diaphragm having a filter therein. It should be noted that the number of detectors and openings may vary in accordance with the particular use of the instant invention.

An angle or optical path length measuring device hereinafter referred to as a diopter is pivotably mounted to the side of the photometer box and is utilized for determining the optical path length of solar radiation through the atmosphere.

With the utilization of a silicon photovoltaic detector, the photometer of this invention has a fully linear response, a minimal temperature dependence and the wavelength range thereof is no longer limited, but can be expanded to approximately 1 micron and thereby permits the use of narrow band interference filters in this region in connection with a conventional zero through 50 microammeter. With the photometer of this invention, for example, one can measure the effect of aerosol on transmittance of the atmosphere for solar radiation and the effect of absorption by water vapor in the solar beam can be studied by using an interference filter at $0.94\mu$. It is furthermore possible to incorporate within the instant invention a germanium photovoltaic detector and interference detector for measurements at a wave length of $1.6\ \mu$.

It is therefore an object of this invention to provide a multi-channel photometer having spectral filters thereon firmly mounted in a side by side relationship at the front thereof so that selection of filter channels is possible by merely changing the aiming direction of the photometer thereby eliminating the need for mechanical filter changers.

It is another object of this invention to provide a multi-channel photometer which utilizes silicon or germanium photovoltaic detectors and thereby extending the wave length range of the instrument.

It is a further object of this invention to provide a multi-channel photometer which is economical to produce and which utilizes conventional currently available components that lend themselves to standard mass producing manufacturing techniques.

For a better understanding of the present invention together with other and further objects thereof reference is made to the following description taken in connection with the accompanying drawing and its scope will be pointed out in the appended claims.

DESCRIPTION OF THE DRAWING

FIG. 1 is a pictorial representation of the multi-channel photometer of this invention showing the diopter in the raised position;

FIG. 2 is a pictorial representation of the multi-channel photometer of this invention pointed toward the sun with the diopter shown in the lowered position; and FIG. 3 is an exploded pictorial view of the diopter which forms part of the multi-channel photometer of this invention.

DETAILED DESCRIPTION OF THE PREFERRED EMBODIMENT

Reference is now made to FIG. 1 of the drawing which best illustrates the multi-channel photometer 10 of this invention. Photometer 10 is made up of a housing 12 having any suitable configuration such as being in the shape of a box of a size sufficiently small to be held in one's hand. bandwidth At the rear portion of housing 12 is mounted any conventional microammeter 14 preferably in the 0–50 range with the dial 16 thereof being exposed through slot 18 within the top of housing 12. Forming the front portion of housing 12 is a rigid diaphragm 20 containing therein a plurality of openings 22, 24, 26 and 28. Behind each opening 22, 24, 26 and 28 is a conventional narrow bandwith filter 22', 24', 26' and 28', respectively, of a predetermined range. Located intermediate microammeter 14 and diaphragm 20 is another rigid diaphragm 30 containing therein a pair of light detectors 32 and 34 operably connected to microammeter 14. Light detectors 32 and 34 are germanium and silicon photovoltaic photocells, respectively, with detector 32 being optically aligned with opening 22 and detector 34 being optically aligned with openings 24, 26 and 28.

It should be further noted that additional openings and filters may be utilized with the photometer 10 of this invention. For example, two or more rows of openings and filters may be accommodated by detector 34.

By utilizing a silicon detector 34 with this invention the wavelength range of the instant photometer 10 is no longer limited to a spectral range of from $0.4\ \mu - 0.64\ \mu$ as in the past but can be expanded to approximately 1.0 microns and thereby permits the use of narrow band interference filters 24', 26' and 28' in connection with a conventional 0–50 microammeter 14. The incorporation of a germanium photovoltaic detector 32 and interference filter 22' permits measurements at wavelengths of up to approximately $1.6\mu$. Electrical separation of detectors 32 and 34 with respect to microammeter 14 is achieved by a conventional double switch 36. In addition a conventional spirit level 37 is located at the top of housing 12 for reasons to be explained hereinbelow.

Reference is now made to FIGS. 1 and 3 of the drawing and in particular to the angle or optical path length measuring diopter 38 shown therein. Pivotably mounted by any suitable securing means such as screw 40 to one side of housing 12 is an angle measuring device 38 made up of elongated segment 42 having an outstanding element 44 at one end thereof and another outstanding element 46 at the other end thereof. This angle measuring device will hereinafter be referred to as diopter 38.

Located within the central portion of outstanding element 46 of diopter 38 is a pin hole 48. A plurality of marks 50, 52 and 54 are positioned on element 44 and are optically aligned with pinhole 48. Marks 50, 52 and 54 are so positioned on element 44 so as to correspond to the respective positions of openings 28, 26 and 24, respectively, within diaphragm 20 when a maximized reading on scale 16 is obtained through each opening and filter. In this manner a beam spot on a particular mark indicates to the observer through which opening the maximum reading corresponds to. Another mark 53 also optically aligned with pin hole 48 is utilized to determine the optical path length of solar radiation in a manner to be described hereinbelow.

It should be noted that only one pinhole 48 and three marks 50, 52 and 54 are shown in the drawing, although any number of these marks (and pinholes, if necessary) corresponding to the number and alignment of openings in diaphragm 20 may be utilized with this invention. In order to avoid utilizing a wider rear element 44, if more than one pinhole were used, a colored filter could be used over additional pinholes thereby readily distinguishing the particular opening the solar beam is reaching. In addition, marks 50, 52 and 54 could be coded according to the corresponding filter for easy reading thereof.

Referring again to FIG. 1, the interior side 56 of diopter 38 and mark 53 on element 44 are calibrated in a manner set forth hereinbelow for determining angular measurements of solar radiation. A linear scale M calibrated from 1–10 by positioning equally spaced marks 1–6 thereon. In calibrating scale M it is essential that when the diopter is in the upright position (that is located 90° to the top edge 58 of housing 12) the 1 unit scale is level with edge 58 and that the distance A between pivot screw 40 and top surface 58 is exactly one unit long with all other markings also a distance A in length. After marking 6 as shown in FIG. 1 the scale 7–10 becomes a projection of the continuation of the linear scale. As will be explained hereinbelow the optical path length M (wherein M=secant z and z is the solar distance of the sun) is read at the intersection of the M-scale and the top edge 58 of housing 12. Mark 53 is made with diopter 38 in the down or retracted position and when a maximized reading is obtained on scale 16. In this manner in the future when a spot of light is on mark 53, a maximum reading is obtained on a scale 16.

MODE OF OPERATION

Reference is now made to FIG. 2 of the drawing which shows the multi-channel photometer 10 of this invention in an operative position being held in the hand 60 of a user.

Photometer 10 may be used to measure, for example, variations by haze, dust, clouds and water vapor of transmittance of the atmosphere for solar radiation in the wavelength range of $0.44–1.6\mu$, calculate the optical thickness and spectral characteristic of the airborne particulates with the possibility to deduce the size distribution of micron sized particles, and determine the total of precipitable water.

In operation the photometer 10 of the instant invention is held in the hand 60 with diopter 38 in the retracted or down position as shown in FIG. 2 of the drawing. In this position photometer 10 is aimed at the sun such that the maximized readings are received on scale 16 as the solar radiation enters openings 24, 26 and 28, passes through filters 24', 26' and 28', respectively, and falls on detector 34 as indicated by the particular illuminated mark 54, 52, and 50 at the instant of the reading. With switch 36 in another position a reading may be received from radiation entering opening 22, passing through filter 22' and falling on detector 32.

After the above readings are recorded, photometer 10 is held level (by the indication on spirit level 37) and the diopter 38 is raised until the solar beam entering pinhole 48 at the front end of diopter 38 shines on mark 53 on back element 44 whose precalibrated position determines the optical path length M. This path length of the solar radiation through the atmosphere is then read at the intersection of the M-scale and the top edge 58 of housing 12. In FIG. 1 such a reading would be approximately 3.5. In the above mentioned case 3.5 would then be the secant of the solar distance of the sun, a conventional reading in the science of atmospheric and stellar photometry.

As is clearly seen the photometer 10 set forth in this invention is extremely easy to use, requires no mechanical filter changers and has a wide range of operation. Although this invention has been described with reference to a particular embodiment it will be understood to those skilled in the art that this invention is also capable of a variety of alternate embodiments within the spirit and scope of the appended claims.

I claim:

1. A multi-channel photometer comprising a housing, said housing having a front portion, a rear portion, a side portion and a top portion, said side and top portion forming an edge therebetween, said front portion having a plurality of openings therein, a different filter means optically aligned with each of said openings for filtering a beam of light passing through each of said openings, means optically aligned with each of said filter means for detecting the amount of light passing through each of said filter means, means operably connected to said detecting means for indicating the amount of light detected by said detecting means and means pivotally connected to said side portion of said housing for determining the angular relationship of said beam of light with respect to the horizontal, said angle determining means having a scale thereon whereby said angular relationship is determined by the intersection of said scale and said edge of said housing.

2. A multi-channel photometer as defined in claim 1 wherein said detecting means is a silicon photovoltaic photocell.

3. A multi-channel photometer as defined in claim 2 wherein said angle determining means comprises an elongated segment pivotably secured to said side of said housing, said elongated segment having a first outstanding element at one end thereof and a second outstanding element at the other end thereof, said first element having a pinhole therein, said second element having a plurality of marks thereon corresponding in number to the number of openings in said front portion of said housing and being optically aligned with said pinhole and said second element having an additional mark thereon located in a predetermined position in accordance with said scale and also being optically aligned with said pinhole.

4. A multi-channel photometer as defined in claim 3 wherein said scale is linear and each unit thereon is equal in length to the distance between said pivotal point and said edge of said housing.

5. A multi-channel photometer as defined in claim 4 further comprising another means optically aligned with at least one of said filter means for detecting the amount of light passing therethrough.

6. A multi-channel photometer as defined in claim 5 wherein said other detecting means is a germanium photovoltaic photocell.

7. A multi-channel photometer as defined in claim 6 further comprising means located on said top of said housing for determining the relative position of said photometer.

8. A multi-channel photometer as defined in claim 7 further comprising a scale operatively connected to said indicating means.

9. A multi-channel photometer as defined in claim 8 wherein said indicating means is a microammeter.

* * * * *